Nov. 18, 1958 D. J. LARSON 2,860,861
RIPPER TOOTH CONSTRUCTION HAVING STOP MEMBER
TO PREVENT WEDGING OF TOOTH TO SHANK
Filed Jan. 24, 1957
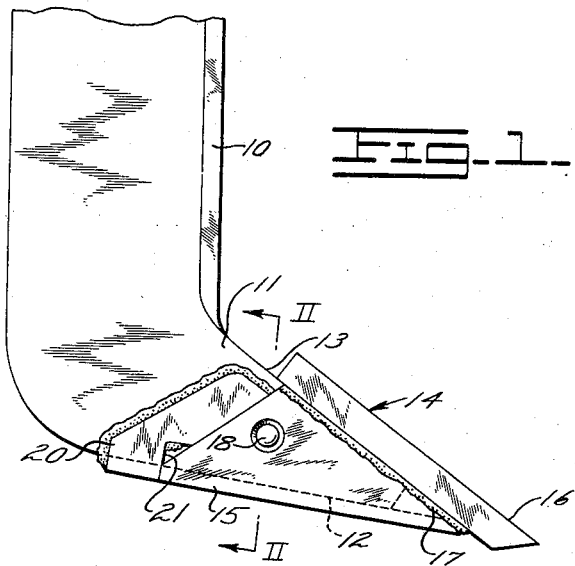
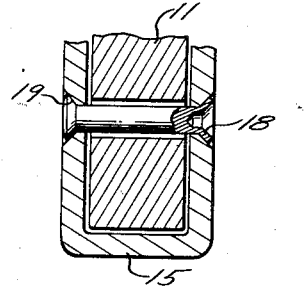
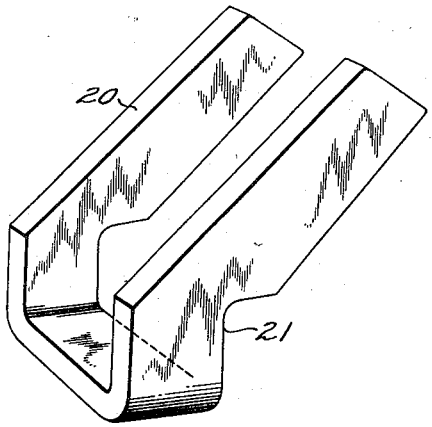
INVENTOR.
DONALD J. LARSON
BY
*Fryer and Johnson*
ATTORNEYS

United States Patent Office 2,860,861
Patented Nov. 18, 1958

2,860,861

RIPPER TOOTH CONSTRUCTION HAVING STOP MEMBER TO PREVENT WEDGING OF TOOTH TO SHANK

Donald J. Larson, Joliet, Ill., assignor to Caterpillar Tractor Co., Peoria, Ill., a corporation of California Application January 24, 1957, Serial No. 636,130

1 Claim. (Cl. 262—8)

This invention realtes to the construction and mounting of teeth used on heavy-duty ripper implements such as are mounted on or drawn by large tractors. More specifically, it relates to a construction for mounting a fabricated tooth on the shank of a ripper.

In heavy-duty implements used for ripping hard substances such as earth, concrete and asphalt pavement, the working end of the ripper shank is usually formed in the shape of a tapered wedge with a tooth mounted on the shank provided with a mating, tapered socket to co-act with the tapered end of the shank. Consequently, when the ripper is advanced through a hard material, the resulting thrust forces are transmitted from the ripper tooth to the ripper shank. These thrust forces are extremely high and act to bind and wedge the tooth to the shank to such an extent that they become extremely difficult to remove. Likewise, the tight wedging action between the tooth and the boot frequently exerts sufficient thrust to split the side walls of the tooth.

During normal operation of a ripper implement, the ripper usually travels forwardly. However, it is sometimes necessary to move the ripper in a rearward direction in order to properly steer the tractor supplying the motive power or to remove the ripper from the material being ripped. In presently available rippers, the tooth is frequently lost or damaged when the ripper is moved rearwardly.

It is an object of this invention to provide a ripper tooth construction having a stop member to prevent tight wedging of the tooth to the shank.

Another object of this invention is to provide means to protect the tooth from damage when the ripper implement is moved rearwardly.

In the drawings:

Fig. 1 is a view in side elevation of the ripper tooth assembly shown mounted on the end of a ripper shank;

Fig. 2 is a fragmentary, vertical section taken on line II—II of Fig. 1 showing means for retaining the tooth tip on the shank; and Fig. 3 is an isometric view of the stop member of the present invention.

Referring to Fig. 1, the assembly of the present invention is shown as including a ripper shank 10 having a forwardly extending nose portion 11. The nose portion 11 of the shank is provided with an inclined lower surface 12 and a more sharply inclined portion 13 on its upper surface forming a taper. A tooth, generally indicated at 14, is adapted to be carried on the nose 11 and co-act with the surfaces 12 and 13 of the nose. The tooth comprises a U-shaped bracket 15 to which a blade 16 is secured as by welding shown at 17. In this manner, a tapered socket is formed by the inner walls of the tooth to conform generally with the nose 11 of the shank 10. However, the relative dimensions of the nose 11 and the tooth 14 are such that a small clearance exists between the nose and the inner walls of the tooth.

As shown in Figs. 1 and 2, the tooth is retained on the shank by means of a rivet 18 which is positioned in aligned bores 19 through the tooth and the shank. The rivet 18 fits loosely in the nose of the shank and merely retains the tooth 14 on the shank during normal inoperative conditions. During ripping operations, the rivet does not transmit any of the forces encountered. As shown in Figs. 1 and 3, a U-shaped stop member 20 is secured to the shank in order to positively locate the tooth on the shank and to prevent tight wedging of the tooth to the shank. The forward edge of the stop member 20 is provided with a notch 21 enabling a weld to be placed forwardly of the stop member without interfering with its abutting surface. This notch is also designed and positioned to provide an abutment for the bottom edge of the tooth which strengthens the structure and protects the rear of the tooth from engagement by earth or the like when the tooth is moving rearwardly. This serves to protect the rivet 18 from being sheared during reverse operation of the shank and tooth.

Due to the clearance provided between the nose and the inner walls of the tooth, the tooth 14 is buttressed against the stop member 20 and there is no wedging action between the shank and the tooth, thus facilitating replacement by merely removing the rivet 18.

I claim:

In combination with a ripper shank having a forwardly inclined lower tapered end, a hollow tooth fitting over said shanks, a pin extending through the tooth and shank and loosely fitted in the shank, and a stop member embracing two sides and the bottom of the shank and welded to the shank to absorb thrust when the tooth moves forwardly through the earth, said stop member having edges for engagement with the rear side portions of the tooth, and having notches in said edges providing space to weld it to the shank and also providing a surface for abutment with the bottom rear edge of the tooth.

References Cited in the file of this patent

UNITED STATES PATENTS

| | | |
|---|---|---|
| 1,834,514 | Brune | Dec. 1, 1931 |
| 2,688,475 | Small | Sept. 7, 1954 |